(12) United States Patent
Arasu et al.

(10) Patent No.: US 11,095,595 B2
(45) Date of Patent: Aug. 17, 2021

(54) COMPUTERIZED SYSTEM AND METHOD FOR PROVIDING A MODIFIED VIEWPORT INBOX DISPLAY

(71) Applicant: VERIZON MEDIA INC., New York, NY (US)

(72) Inventors: Ayyappan Arasu, Sunnyvale, CA (US); Girish Subramanyam, Sunnyvale, CA (US); Nishit Chokhawala, Sunnyvale, CA (US)

(73) Assignee: VERIZON MEDIA INC., New York, NY (US)

( * ) Notice: Subject to any disclaimer, the term of this patent is extended or adjusted under 35 U.S.C. 154(b) by 57 days.

(21) Appl. No.: 16/528,842

(22) Filed: Aug. 1, 2019

(65) Prior Publication Data

US 2021/0036980 A1 Feb. 4, 2021

(51) Int. Cl.
*H04L 12/58* (2006.01)
*G06F 40/205* (2020.01)

(52) U.S. Cl.
CPC ............ *H04L 51/22* (2013.01); *G06F 40/205* (2020.01)

(58) Field of Classification Search
CPC .................. H04L 51/22; G06F 40/205; G05B 2219/25222
See application file for complete search history.

(56) References Cited

U.S. PATENT DOCUMENTS 10,574,615 B2 * 2/2020 Sachidanandam ...... H04L 51/06
2016/0323218 A1 * 11/2016 Sadanandan ............ H04L 51/22
2017/0214647 A1 * 7/2017 Shrivastava .......... G06F 3/0482

* cited by examiner

*Primary Examiner* — Benjamin R Bruckart
*Assistant Examiner* — Tien M Nguyen
(74) *Attorney, Agent, or Firm* — James J. DeCarlo; Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a novel framework that uses data related to users' personal, online and real-world activity, and inbox viewport information to identify messages that the users will interact with the next time the users view their inbox. Based on this, the user's inbox view can be modified so that third party messages can be situated amongst those messages (e.g., adjacent to or within n positions), so that the user will most likely view that message when interacting with the messages deemed important to the user. Thus, the disclosed framework provides mechanisms for message platforms, systems and applications to modify a user's inbox to strategically position messages from third party providers to capture the attention of the receiving user.

20 Claims, 9 Drawing Sheets

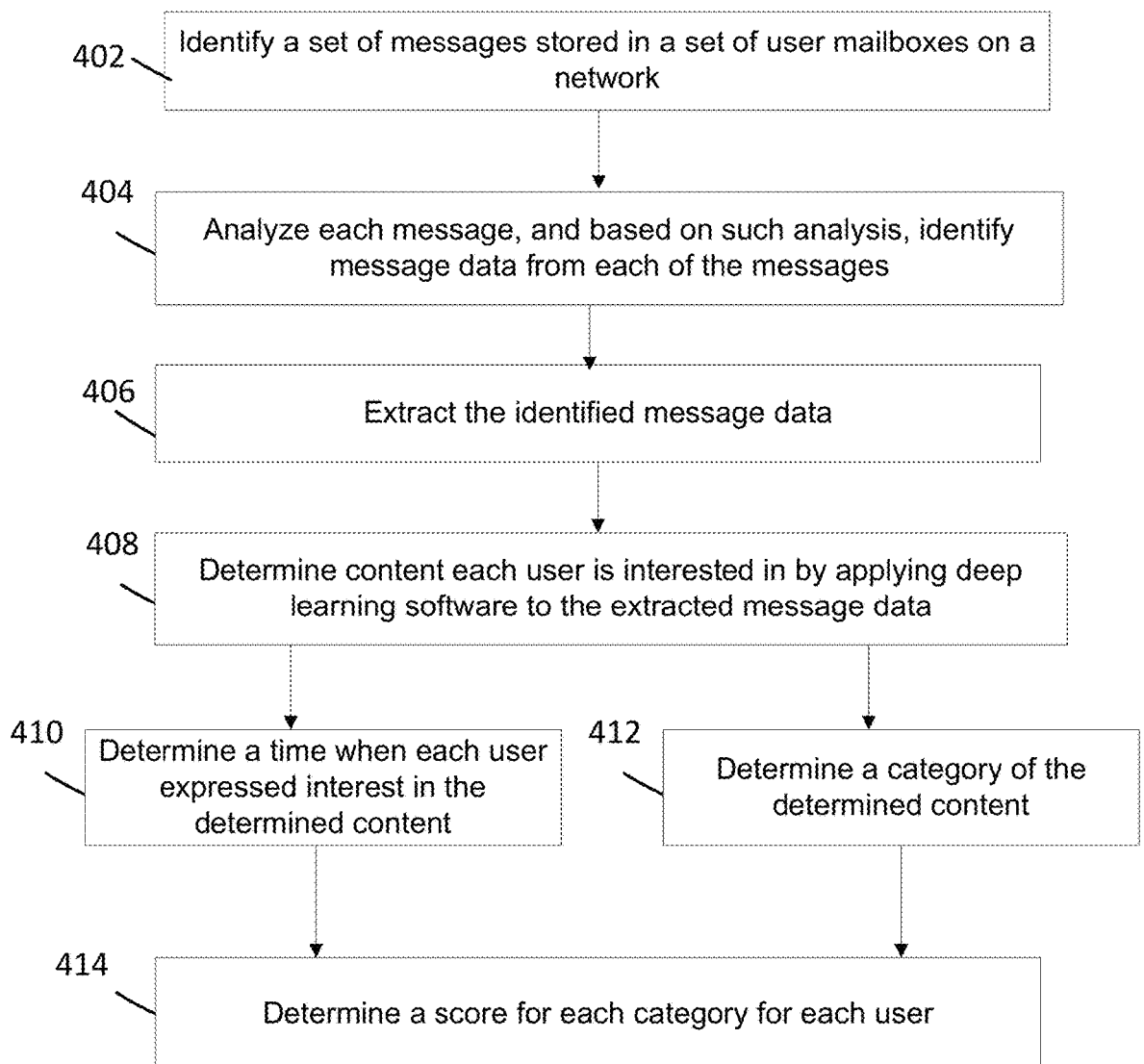

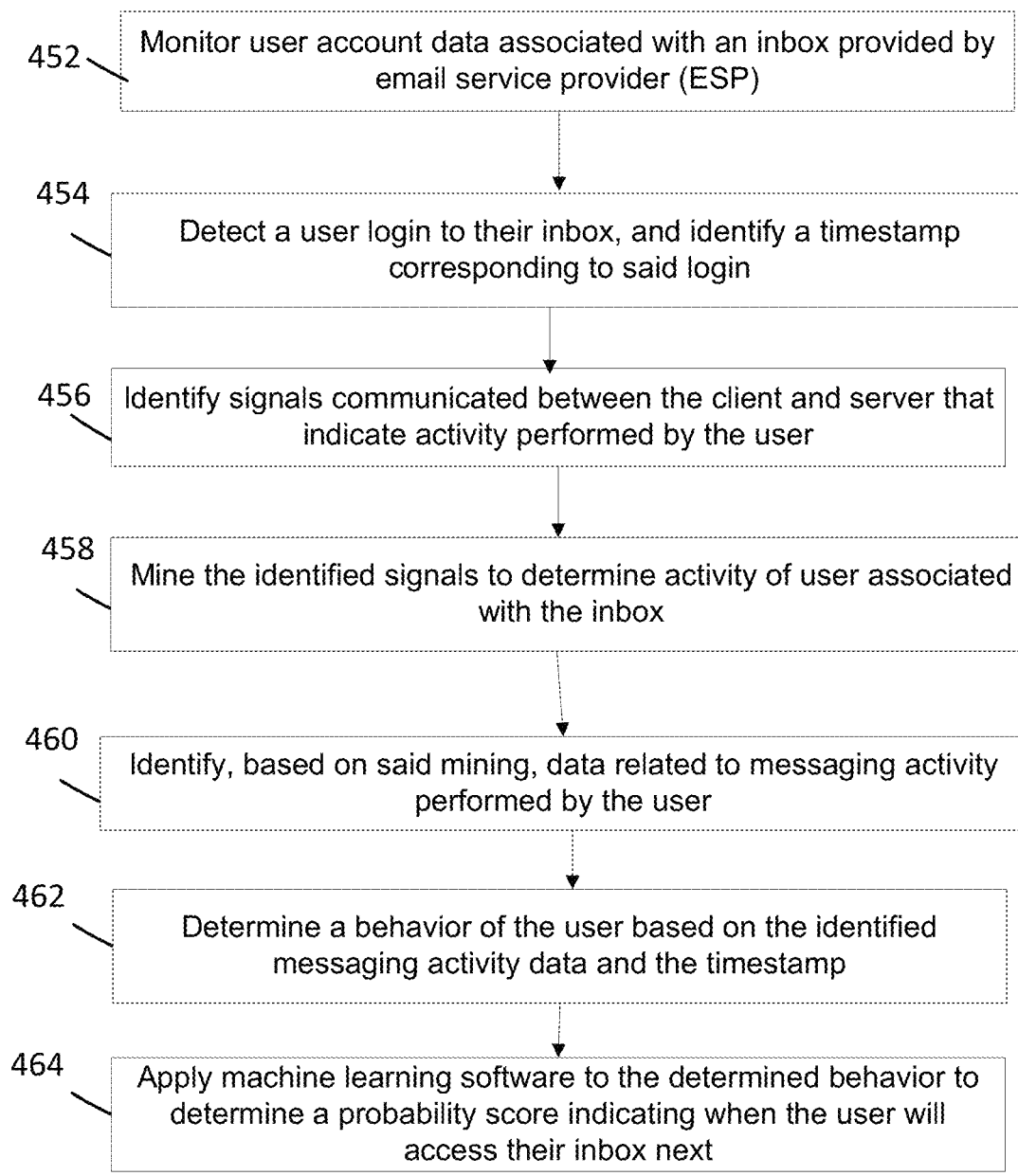

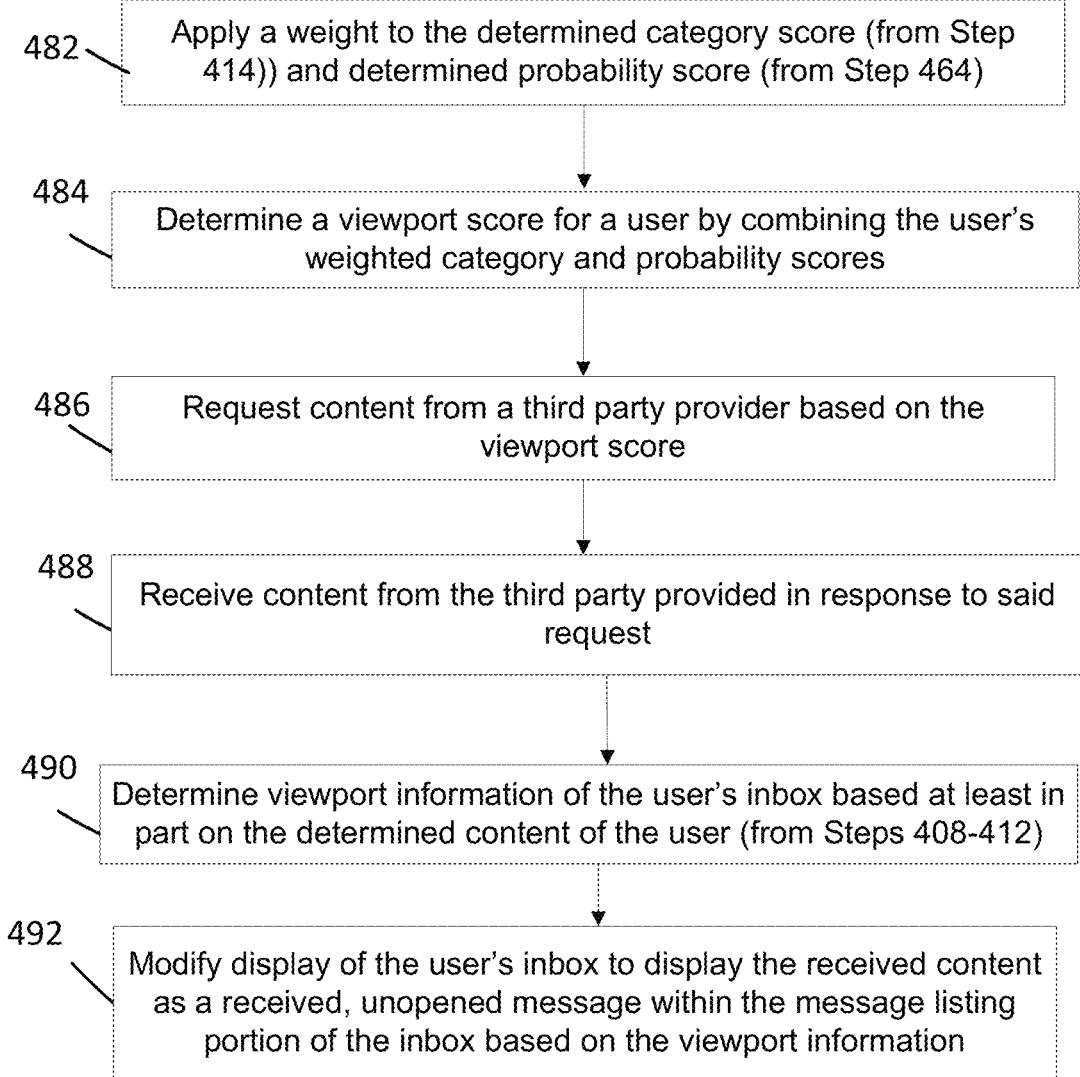
FIG. 4C    480

| Message 1 | Message 2 | AD MESSAGE | Message 3* | Message 4 | Message 5 |

COMPUTERIZED SYSTEM AND METHOD FOR PROVIDING A MODIFIED VIEWPORT INBOX DISPLAY

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network based computerized content hosting and providing devices, systems and/or platforms by modifying the capabilities and providing non-native functionality to such devices, systems and/or platforms through a novel and improved framework for a messaging platform that automatically modifies how messages in a user's inbox are organized and displayed by providing for display third party messages based on the viewport state of the inbox.

BACKGROUND

Email providers like Gmail®, Yahoo!® and Outlook®, for example, are in a unique position where they can, or can be utilized or leveraged to, influence how messages and/or particular types or forms of content can be displayed within a user's inbox. However, the functionality such providers are currently utilizing fails to accurately and efficiently (both in a computational manner and from a user-facing aspect) provide mechanisms where their influence impacts how messages are interacted with, regardless of the identity of the sender or content contained therein.

In such current messaging ecosystems, corporate and small business marketing dollars are spent on acquiring users through relatively easy targeting using emails. Both ESPs (Email Service Providers) and MTAs (Mail Transfer Agents) play a critical role in bulk email distribution. In current setups, certain heuristics and user understanding is used to target the users at specific times. However, users are targeted in a bulk mode, without the intelligence of the user's inbox state or knowledge of where the email will land in the user's inbox. This often leads to low yield in Open rate and clicks.

For example, current systems simply determine when a user is "online" (e.g., has opened his/her mail application and is currently viewing their inbox), and use this information to place an email message from a third party at the slot zero (top) in the inbox. However, simply leveraging knowledge of a user's online presence does not garner the results in user's actually interacting with the third party messages (e.g., receiving the user's attention or yielding a click through). Moreover, performing such third party message placement is technologically challenging, especially for certain IMAP and POP3 distribution protocols, as the number of signals used to determine if the user is online is varied, and there is a significant delay before they can be detected, where in such cases, the user may already have logged off (or moved to a different screen or app).

In alternative situations where offline slotting of messages within an inbox is used, similar if not more complex technical difficulties arise. Since there is no fixed pattern or determinable mechanism to identify when, where and if a user will log back in, there is no way to determine if the offline slotted message will even appear on the first page of the user's inbox, let alone as the top slot. Indeed, the fact that a message occupies the first slot in a user's inbox does not guarantee that the user will engage with that message.

SUMMARY

Thus, there is a need for a messaging framework that can determine (e.g., predict) i) types of messages a user is interested in receiving, and ii) the likelihood that the user will actually click on those messages. As discussed in more detail below, the disclosed framework can utilize modern AI techniques that can input the user's personal and online and real-world activity, as well as the user's inbox viewport information to identify messages that the user will interact with the next time the user views his/her inbox. Based on this, the user's inbox view (e.g., message listing) can be modified so that third party messages can be situated amongst those messages (e.g., adjacent to, either above or below, or within n positions of the messages), so that the user will most likely view that third party message when interacting with the messages deemed important to the user. This will result in better results for the email marketer as their messages will yield higher open rates and click throughs.

Thus, the disclosed systems and methods provide mechanisms for message platforms, systems and applications to modify a user's inbox to strategically position messages from third party providers (e.g., email marketers, ad agencies, event promotors that can bid to provide content to users) to capture the attention of the receiving user.

As discussed herein, reference to "messages" can be any type of message, content card or asset that is receivable within any known or to be known messaging or email system. For purposes of this disclosure, reference will be made to electronic mail (email); however, it should not be construed as limiting, as any form of messages, cards or assets can be utilized without departing from the scope of the instant disclosure. The message content comprised within such messages, cards or assets can be any type of digital content, such as, but not limited to, text, audio, video, graphics interchange format (GIF) files, digital advertisements, uniform resource locators (URLs), and/or any other type of known or to be known multimedia or network resource, or some combination thereof.

In accordance with one or more embodiments, the instant disclosure provides computerized methods for a novel framework that automatically modifies how messages in a user's inbox are displayed by providing third party messages based on the viewport state of the inbox. In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, email server, ad server, content server and/or client device, and the like) cause at least one processor to perform a method for a novel and improved framework that automatically modifies how messages in a user's inbox are displayed by providing third party messages based on the viewport state of the inbox.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 4A-4C are block diagrams illustrating an exemplary data flow in accordance with some embodiments of the present disclosure;

FIG. 7 is an example embodiment of a modified user inbox in accordance with some embodiments of the present disclosure.

DESCRIPTION OF EMBODIMENTS

Figure 1:
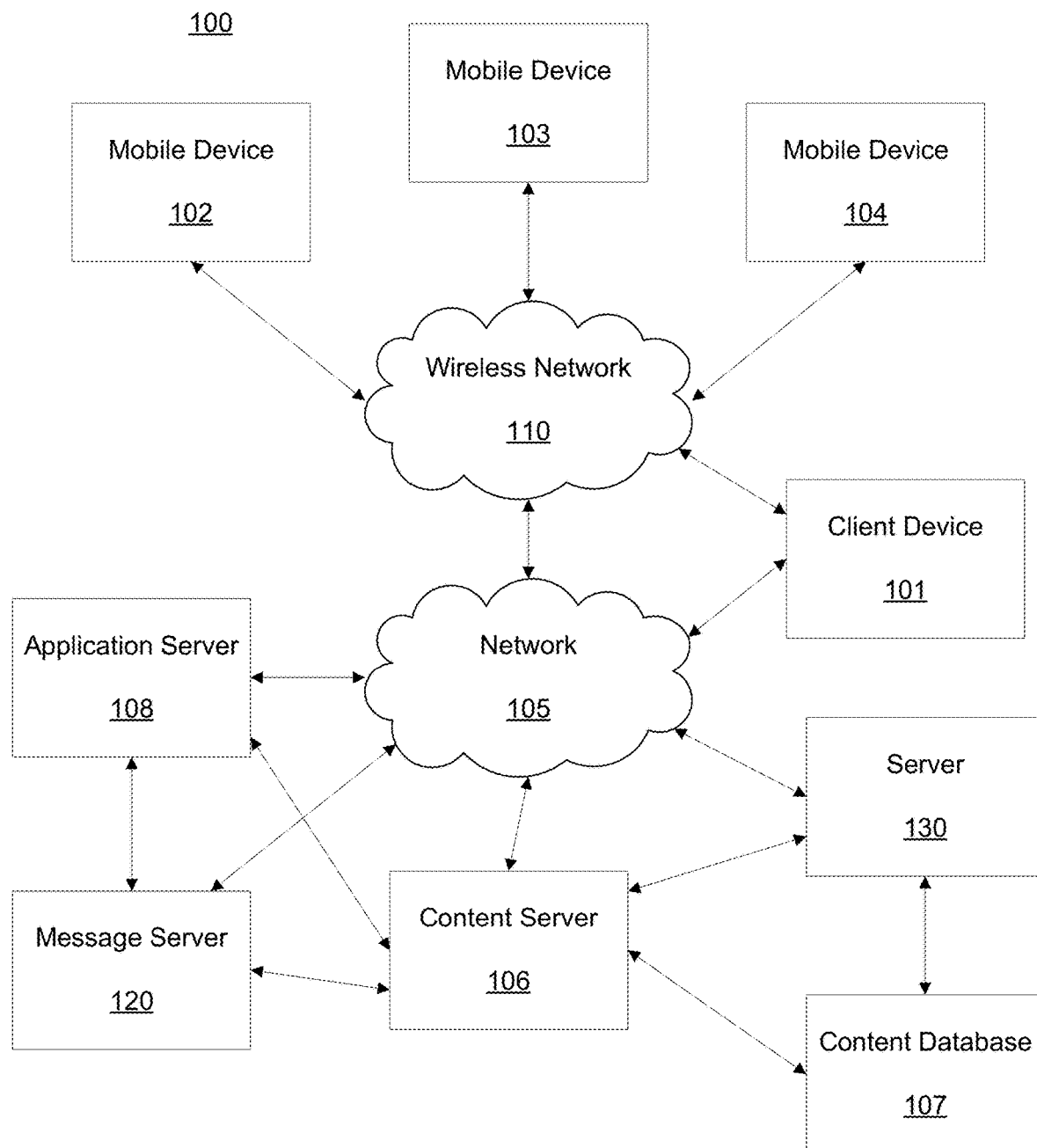
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The instant disclosure provides improved systems and methods for providing a framework to messaging systems, platforms and applications that automatically modifies how messages in a user's inbox are displayed based on the viewport state of the inbox.

As discussed in more detail below, according to some embodiments, the disclosed systems and methods determine and use data related to a user's personal, online and real-world activity, and inbox viewport information to identify messages that the user will interact with the next time the user views their inbox. Based on this, the user's inbox view can be modified so that third party messages can be situated amongst those messages (e.g., adjacent to or within n positions), so that the user will most likely view that message when interacting with the messages deemed important to the user. Thus, the disclosed framework provides mechanisms for message platforms, systems and applications to modify a user's inbox to strategically position messages from third party providers to capture the attention of the receiving user.

Moreover, the disclosed framework provides functionality for third parties (or entities) to bid on the positional placement of their messages within the user's inbox. As discussed in more detail below in reference to FIG. 5, this enables a supply and demand based bidding model for advertisers to position their assets into the user's inbox. For example, in the case of email marketers (EMs), marketing or ad messages can be situationally and strategically placed next to known messages of interest to the user, which should increase the ad messages' click through and open rates. In some embodiments, this can involve EMs registering their campaigns with a service provider (e.g., Verizon®) or other content or service providing entity executing engine 300, as discussed below. Such registering can involve EMs providing or making available their creatives (which can include, as discussed herein, their proprietary or hosted digital content, ad messages, emails, cards and assets) for dissemination via the disclosed framework. Thus, according to the bidding model discussed herein, as provided in FIG. 5 below, the demand for third party content along with the supply from EMs enables EMs to bid for and win opportunities to provide or target users with their content.

According to the discussion herein, as understood by those of skill in the art, the term "viewport" is used to denote a user's view of his/her inbox as the user is browsing his email. Viewports are supported in mail applications on devices, such as, Android®, IOS® and Desktop® or through IMAP clients. The disclosed systems and methods use email signals to determine the current viewport of a user's inbox, as discussed in more detail below.

Such signals can include data indicating, but are not limited to, last read time of messages by the user, last time the user opened the viewport, device the user used to view his viewport, computed score to get the graph scores (depth and distance) for the domain for the user, features extracted from the subject, read/unread per session for the user, read/unread state of the previous viewports, position in viewport for clicked previous messages, did the user scroll/ no scroll for the messages the read or performed action, overall spam score of the email sender, spam score of the email sender with respect to user, interest score for the message for the user, interest score for the message (mailing list) across all users, position of the message within the viewport, features derived from actionable emails like password change, receipts, statements, orders and the like, number of messages read versus unread for the user, distribution of unread messages v/s read messages over time, features derived from inbox access events, travel reservations (e.g., out of office messages), features derived from integrated calendar events, number of times a user reads an email, email types/categories the user has read, location signals (e.g., home, office, away), and the like, or some combination thereof.

As discussed in more detail below at least in relation to FIGS. 4A-5, according to some embodiments, information associated with, derived from, or otherwise identified from, during or as a result of the inbox analysis or modification of its display, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")-network 105, wireless network 110, mobile devices (client devices) 102-104 and client device 101. FIG. 1 additionally includes a variety of servers, such as content server 106, application (or "App") server 108, message server 120 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), instant messaging application, blog, photo or social networking application (e.g., Facebook®, Twitter® and the like), search application (e.g., Yahoo!® Search), and the like, can be hosted by the application server 108, message server 120, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108 and/or 130 may be integrated into a single computing device, without departing from the scope of the present disclosure.

Figure 2:
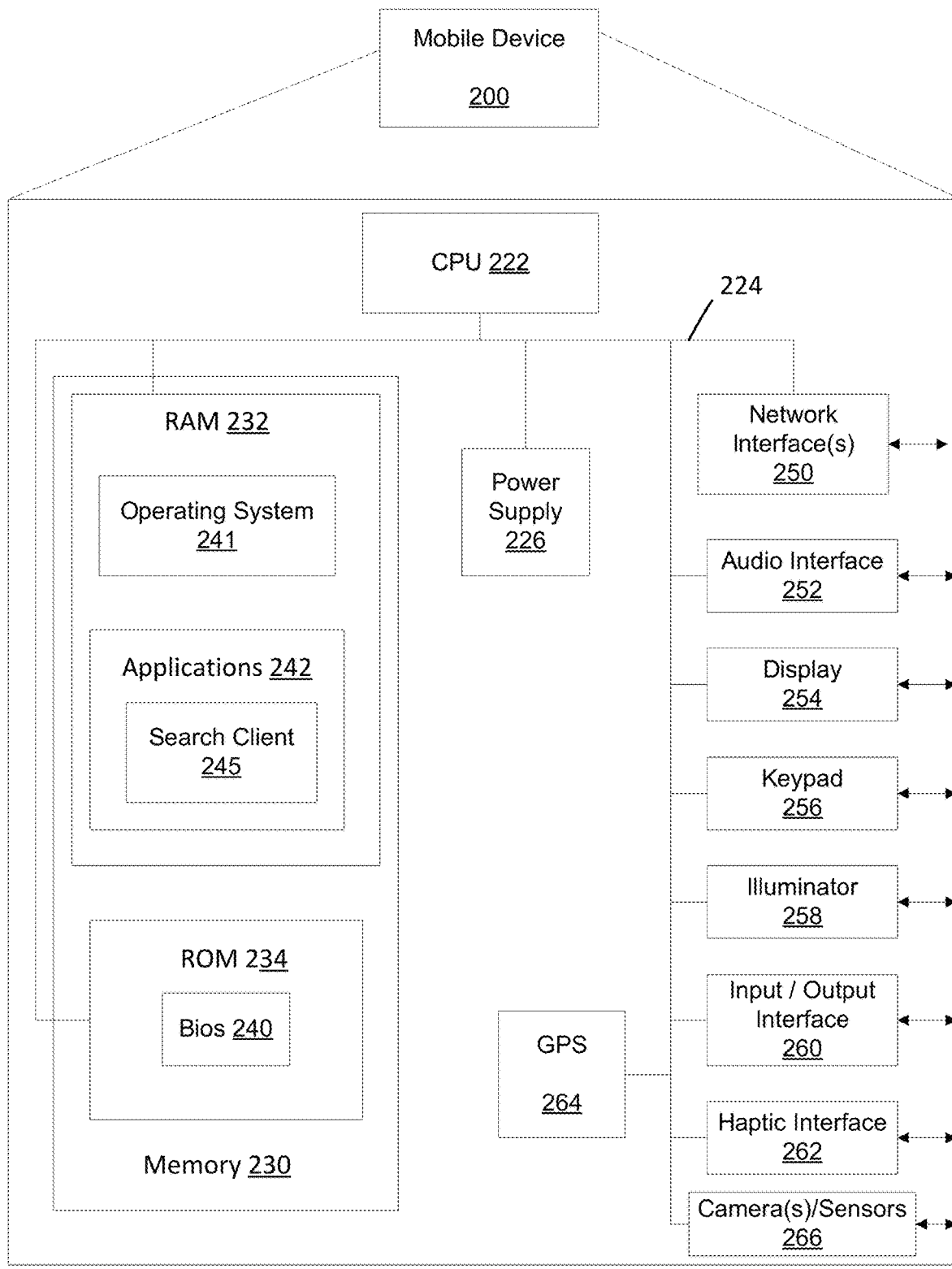
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-6.

Figure 3:
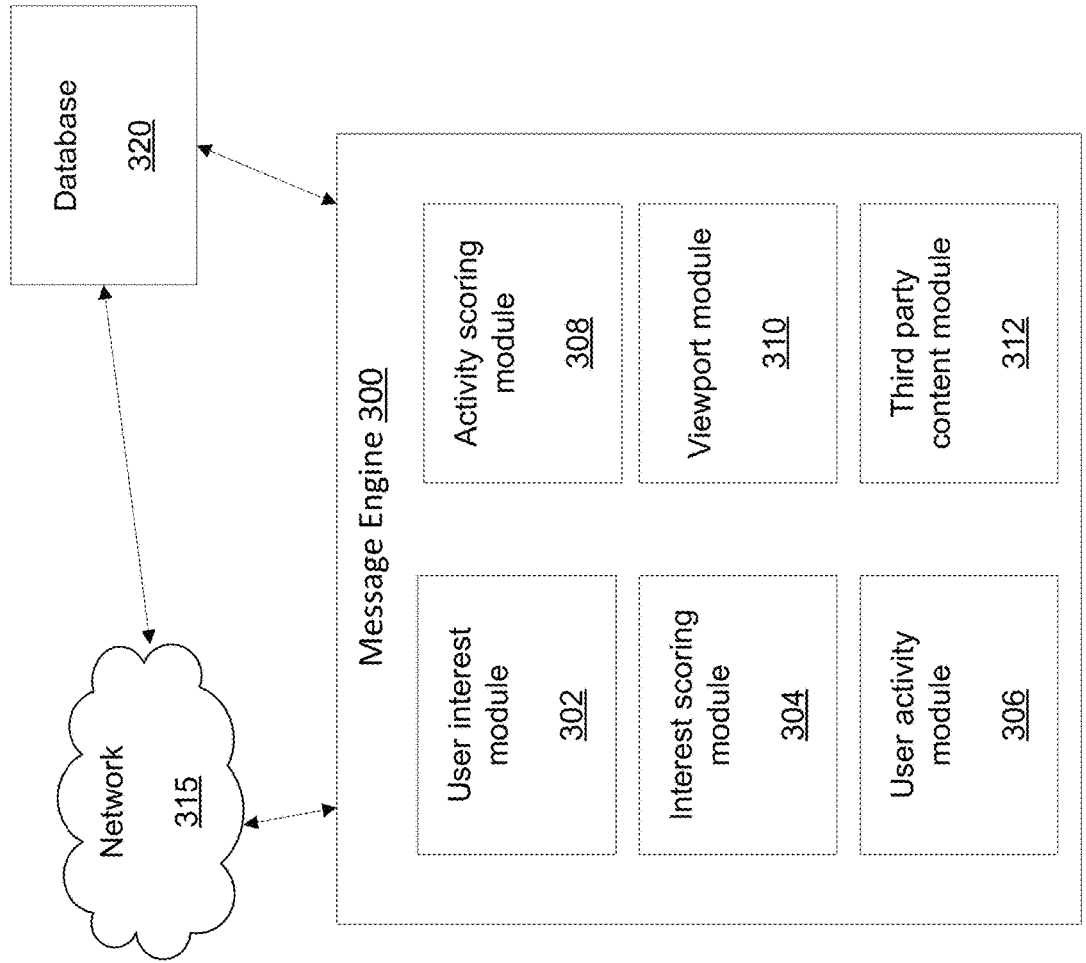
FIG. 3 is a block diagram illustrating components of an exemplary system in accordance with embodiments of the present disclosure.

FIG. 3 is a block diagram illustrating the components for performing the systems and methods discussed herein. FIG. 3 includes message engine 300, network 315 and database 320. The message engine 300 can be a special purpose machine or processor and could be hosted by an application server, content server, social networking server, web server, messaging server, search server, content provider, third party server, user's computing device, and the like, or any combination thereof.

According to some embodiments, message engine 300 can be embodied as a stand-alone application that executes on a user device. In some embodiments, the message engine 300 can function as an application installed on the user's device, and in some embodiments, such application can be a web-based application accessed by the user device over a network. In some embodiments, the message engine 300 can be installed as an augmenting script, program or application (e.g., a plug-in or extension) to another application (e.g., Yahoo! Mail®).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a user from an assortment of media and/or service providers and/or platforms. For example, the information can be related to, but not limited to, content type or category, information associated with the sender or recipient(s) of a message, information associated with content included in a message, and any other type of known or to be known attribute or feature associated with a message or content of a message, or some combination thereof.

According to some embodiments, information related to, derived from or otherwise determined from analysis of messages addressed to and/or hosted within a user's inbox can be stored in database 320 as n-dimensional vector (or feature vector), where the information associated with each message can be translated as a node on the n-dimensional vector for an inbox. In some embodiments, each message can have its own vector where the information included therein can be represented by the nodes on a respective vector. In some embodiments, as messages are sent/received, detected and/or tracked, information corresponding thereto can also be stored in the database 320 in a similar manner.

Database 320 can store and index inbox/message information in database 320 as linked set of inbox/message data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify vector information for messages within an inbox.

For purposes of the present disclosure, as discussed above, messages (which are stored and located in database 320) as a whole are discussed within some embodiments; however, it should not be construed to limit the applications of the systems and methods discussed herein. That is, while reference is made throughout the instant disclosure to messages (e.g., email messages or other forms of electronic messages), other forms of messages (e.g., social media messages, Instant Messages (IMs)) and/or content items (e.g., assets or cards), and other mediums that display digital content information in whole or in part (e.g., a map), and the content included therein, including, text, audio, images, multimedia, RSS feed information, can be used without departing from the scope of the instant application, which can thereby be communicated and/or accessed and processed by the message engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the message engine 300, and the database of stored resources 320. Indeed, as illustrated in FIG. 3, the message engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as message engine 300, and includes user interest module 302, interest scoring module 304, user activity module 306, activity scoring module 308, viewport module 310, third party content module 312. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIGS. 4A-4C, Processes 400, 450 and 480 provide example data flows detailing how the disclosed messaging framework determines viewport information for a user's inbox that can be utilized for providing third part content within the user's inbox message listing.

According to some embodiments of Process 400 of FIG. 4A, Steps 402-406 of Process 400 are performed by the user interest module 302 of message engine 300; and Steps 408-414 are performed by the interest scoring module 304.

According to some embodiments of Process 450 of FIG. 4B, Steps 452-460 of Process 450 are performed by the user activity module 306 of the message engine 300; and Steps 462-464 are performed by the activity scoring module 308.

According to some embodiments of Process 480 of FIG. 4C, Steps 482-484 and 490-492 of Process 480 are performed by the viewport module 310 of the messaging engine 300; and Steps 486-488 are performed by the third party content module 312.

Beginning with Process 400 of FIG. 4A, Step 402 begins with the identification of a set of messages to be analyzed. In some embodiments, the set of messages can be those associated with a user's inbox, and in some embodiments, the set of messages can be those associated with an aggregate of user inboxes—e.g., inboxes of users associated with an email domain, message platform, messaging service and the like. In some embodiments, the set of messages can be across domains or messaging platforms. In some embodiments, the set of the messages can be messages sent/received within a predetermined time period, messages associated with a geographic location, messages of a particular type, messages that include a type of content or message context, messages that have been responded to or forwarded to other users, or any other type of activity performed on sent/received messages (e.g., tagged, deleted or otherwise categorized within a user's inbox), and the like, or some combination thereof.

In Steps 404-406, each message identified in Step 402 is analyzed and the message data included in those messages can be collected, extracted, retrieved or otherwise identified. According to some embodiments, the analysis involves parsing each message's data and metadata and identifying the data included in the header, subject line and/or message body. Step 404. Upon identifying the data, it can then be extracted (and in some embodiments, stored in database 320, as discussed above). Step 406.

The message data identified from the analysis that is collected can include, but is not limited to, the name (or identifier), type and address of the sender and/or recipient, phone number, IP address, location (that is referenced in the message, of the sender/recipient), context, type and category of the content in the message, tags or other identifiers or classifiers applied to or embedded within the message, characteristics/features of the content (e.g., items in the subject line and message body, attributes or definitions of the content, and body character length and number of URLs occurring in the body), types of messages (e.g., user generated or machine generated from a template), attributes/features from the address of the sender/recipient (e.g., which domain, subdomain and/or sub-name, and the like), behavioral features indicative of the actions taken on and/or to generate the messages (e.g., the sender's outgoing activity such as weekly and monthly volumes of sent messages, histogram of the number of recipients in their messages, which action was performed on the message, if any, when it was received by a recipient, and the like), temporal behavioral features associated with the message (e.g., a frequency of specific actions over a period of time—for example, whether a sender sends more than x messages in an hour), and the like, and/or some combination thereof. Such message data can also include the signal data as discussed above.

According to some embodiments, Steps 404-406 can also involve identifying information about the sender/recipient of each message or content included in each message, and using this data to retrieve additional or supplemental information from other online sources such as, but not limited to, online directories, social networking websites, web pages, results pages found by search engines, and the like. Thus, additional information related to the messages can be identified and utilized as part of the category and/or viewport scoring, as discussed below.

In Step 408, the message data identified and extracted from the user's messages is analyzed by applying deep learning software in order to determine the content the user is interested in. For example, the user's inbox has messages sent to and from friends, family and companies; and, from the analysis of Step 408, it is determined that the user is most interested in messages from his friends related to online gaming.

According to some embodiments, the deep learning processing performed in Step 408 can be performed via any known or to be known machine-learning classifier or deep learning architecture, algorithm, technique or mechanism, including, but not limited to, deep neural networks (DNNs), artificial neural networks (ANNs), convolutional neural networks (CNNs), deep belief networks, linear classifiers (e.g., logistic regression, naive Bayes classifier), support vector machines, decision trees, boosted trees, random forest, neural networks, nearest neighbor algorithm, and the like.

Thus, in Step 408, a machine learning defined software application or kit can receive message data as input, and determine a time when a user expressed interest in the content (Step 410), and its classification or category (Step 412) as output. As in Step 410, a determination is made as to when the user expressed interest in the content (or message), which can include, but is not limited to, when the user interacted with the content, read the content, opened the message and viewed the content, forwarded the message, replied to the message, and the like. It should be understood that the time when the user expressed interested in the determined content correlates with the activity that provided the classifier the indication that the user was interested in the content.

According to some embodiments, Steps 410 and 412 can be performed in parallel as part of Step 408; and in some embodiments, Steps 410 and 412 can be performed sequentially, in either order.

In Step 414, a score is determined for each category. The score determination is based on the determined time from Step 412 and the determined category from Step 412. According to some embodiments, the application of a deep learning software from Step 408 produces the results from Steps 410 and 412, and can also produce the scoring values for each category for each user.

Having now determined the user interest scores for each category of content in the messages in a user inbox(es), the disclosed systems and methods turn to Process 450 of FIG. 4B. Process 450 provides the mechanisms of the messaging framework for determining when a user will be online (e.g., the next time they will access their mail application and view their inbox).

Process 450 begins with Step 452 where a network (e.g., Internet) is monitored for user account data associated with an inbox provided by an ESP. The monitoring involves analyzing signals sent to and from client devices to the ESP server in order to determine if a beacon/signal is sent to the server requesting access to the ESP hosted account information.

In Step 454, such signal is detected and a timestamp is recorded. The timestamp indicates when the user logged into his/her mail account and viewed their inbox. Such logging in can be associated with an initial login upon creating an account, or when the user logs back in to an existing account.

In Step 456, signals communicated between the client device the user used to login to their account and the server are identified; and in Step 458, they are mined in order to determine messaging activity of the user. Such mining can involve analyzing the signals and parsing them to identify the bits of each signal which indicate they correspond to messaging activity. In Step 460, such messaging activity signals are analyzed in order to determine the type activity the user is performing (e.g., composing a message, deleting messages, responding to messages, updating his/her contacts, selecting URLs within messages, saving attachments, and the like).

Thus, for example, Steps 456-460 can involve identifying that a user has read a message an email by identifying a fetch signal from the client device to the server for retrieval of the message. In another example, Steps 456-460 can involve identifying that a user has sent a message by identifying instructions sent from the client device to the server to relay the message to a specific address on the network.

In Step 462, engine 300 determines a behavior of the user based on the identified messaging activity and the timestamp of when the user logged in. In some embodiments, the behavior can be associated with that particular online session; and in some embodiments, the behavior can be used as an aggregate behavior for the user across all or a plurality of online sessions. In some embodiments, the aggregate behavior can be for multiple users—for example users associated with a particular location, using a particular ESP, during a specific time period, and the like. The determined behavior can indicate when the user logged on, and what messaging actions where performed while logged on. In some embodiments, the behavior can also include a timestamp for each messaging action. And, in some embodiments, the behavior can indicate a time when the user logged off.

In Step 464, machine learning software can be applied to the determined behavior to determine a probability score that indicates when the user will access their inbox next. In a similar manner as discussed above in relation to Steps 408-414, any form of known or to be known machine learning architecture, algorithm, technique or mechanism can be applied to the determine behavior information of the user in order to compute a probability scoring value that indicates i) when the user will be online next, and ii) how long the user's next online session is expected to be. This information can be determined based on the determined behavior of the user, which provided indications of how long the user was online, and what typical actions the user performed during that time span.

Having now determined the user interest scores for each category of content in the messages in a user inbox (from Process 400), and the probability scores indicating when the user will login next (from Process 450), the disclosed systems and methods turn to Process 480 of FIG. 4C. Process 480 provides mechanisms for the messaging framework to provide relevant third party content (referred to as ad messages) to the user within their inbox the next time the user logs in to their account.

Process 480 begins with Step 482 where the determined category score (from Step 414) and the determined probability score (from Step 464) are each weighted. According to some embodiments, the weighting performed by engine 300 here involves weighting the category score more than the probability score, since, in some embodiments, it can be more important for the engine 300 to know which forms of content the user is interested in when compared to knowing when they'll next login. Thus, for example, the category scores can be multiped by a factor of 2 to evidence that they outweigh the probability scores.

In some embodiments, Step 482 can involve weighting only the category score. In some alternative embodiments, the probability score can be weighted more than the category score. And, in some alternative embodiments, there may be no weighting of the category and probability scores.

In Step 484, the weighted category and probability scores are combined, which results in the determination of a viewport score for a user's inbox. As discussed above, the viewport of a user's inbox indicates the viewing or browsing state of the inbox view—e.g., which messages being viewed or displayed within messaging listing of the inbox. This score provides an indication as to when the user will be online, and what they will be viewing when they are (e.g., provides an indication as to the category or type of content the user is interested in and will be interacting with once presented his/her inbox again).

In Step 486, a request for third party content is communicated to an ad platform, where the request comprises the viewport score. Ad content matching the viewport score are identified and are then received by the server. Step 488. In some embodiments, the ad content is formatted as a message from the providing third party.

According to some embodiments, disclosure of how the third party content is provided to the user is provided below in reference to FIG. 5.

In Step 490, viewport information of the user's inbox is then determined based at least on the determined content of the user (from Steps 408-412). This involves determining the k most interested messages in the user's inbox, which was indicated by the message data of the user from FIG. 4A. Thus, the determined content of the user provides an indication as to the messages of most interest to that user, as discussed above.

For example, the user is most interested in online gaming messages from her friends (e.g., friends: as indicated by those addresses in her contacts). Thus, the top k online gaming messages from users in the user's contacts can be identified. Here, information related to these top k messages serves as the viewport information. For example, the viewport information can indicate the type of content (e.g., online gaming content), the time and date of such message and/or the time of the online gaming, which site(s) was used for the online gaming activity, the sender and/or recipient(s) of the message, and the like.

In Step 492, the received ad message is displayed within the inbox as an unread message (e.g., received and unopened) within the message listing portion of the user's inbox. Such display is based on the viewport information. Thus, the user's inbox is modified to display the ad message in association with other messages of interest (e.g., top k message(s)) the next time the user opens his/her inbox. If the user is currently or still online when the ad message is determined, the server will wait until the user logs off in order to modify the inbox so that the modification happens offline and the user is presented with the updated inbox upon his next access to his/her account.

For example, the ad message can be placed immediately above or within n slot positions above the most recently received online gaming message from a friend. In another example, the ad message can be placed immediately below or within n slot positions below the most recently received online gaming message. In some embodiments, for example, the ad message can be placed adjacent to (e.g., next to or within n slot positions above or below) each of (or a subset of) the top k online gaming messages.

In some embodiments, the ad message can be placed next to the most recently received message of a type; or can be placed next to the most popular or most viewed message of the type.

In some embodiments, the ad message can be placed next to the same type of message as the top k messages upon the next time one of that type is received. For example, the next time an online gaming message is received from a user's friend, the ad message can be displayed adjacent to that new message, as discussed herein.

Figure 5:
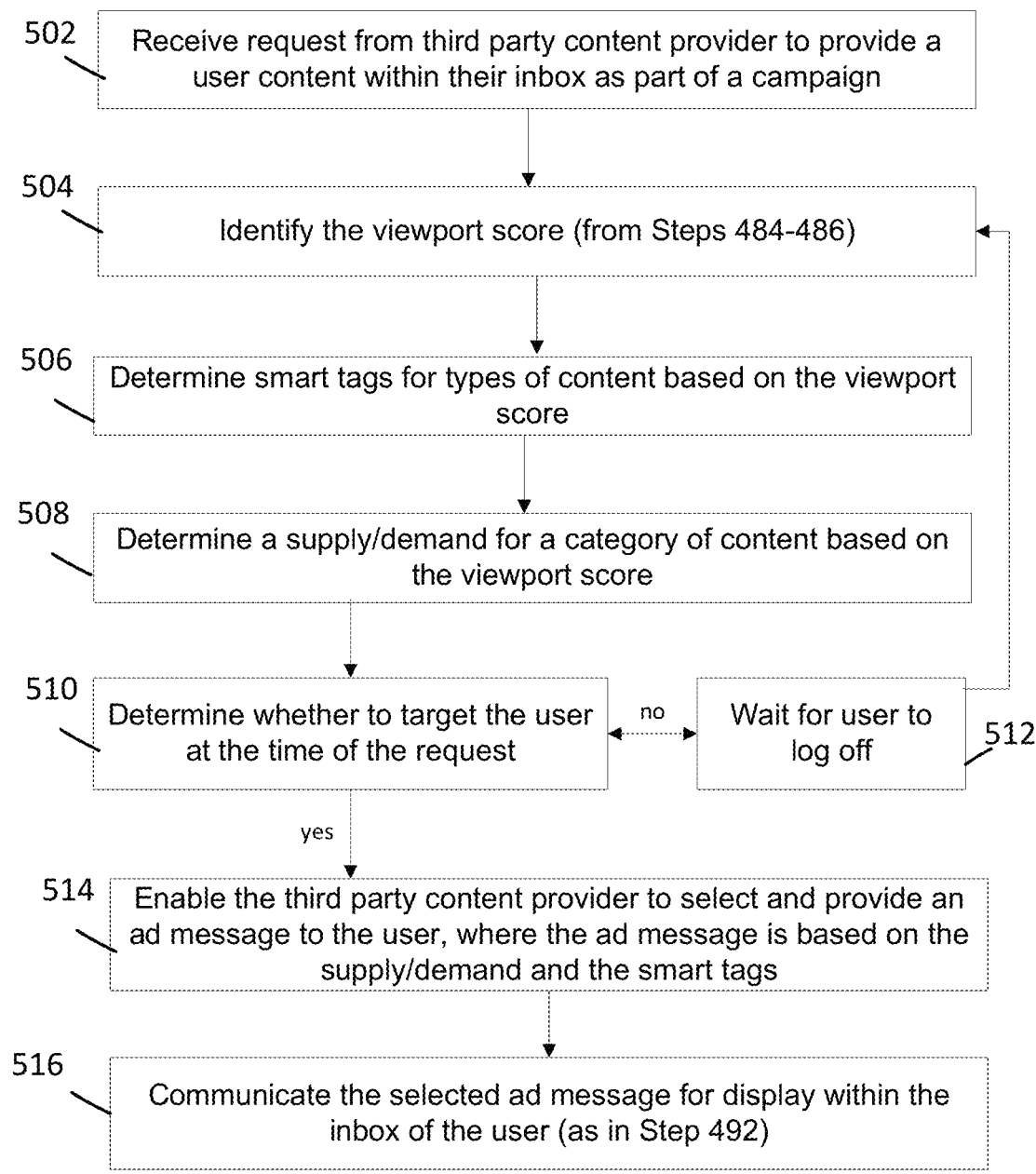
FIG. 5 is a block diagram illustrating an exemplary data flow in accordance with some embodiments of the present disclosure.
Figure 6:
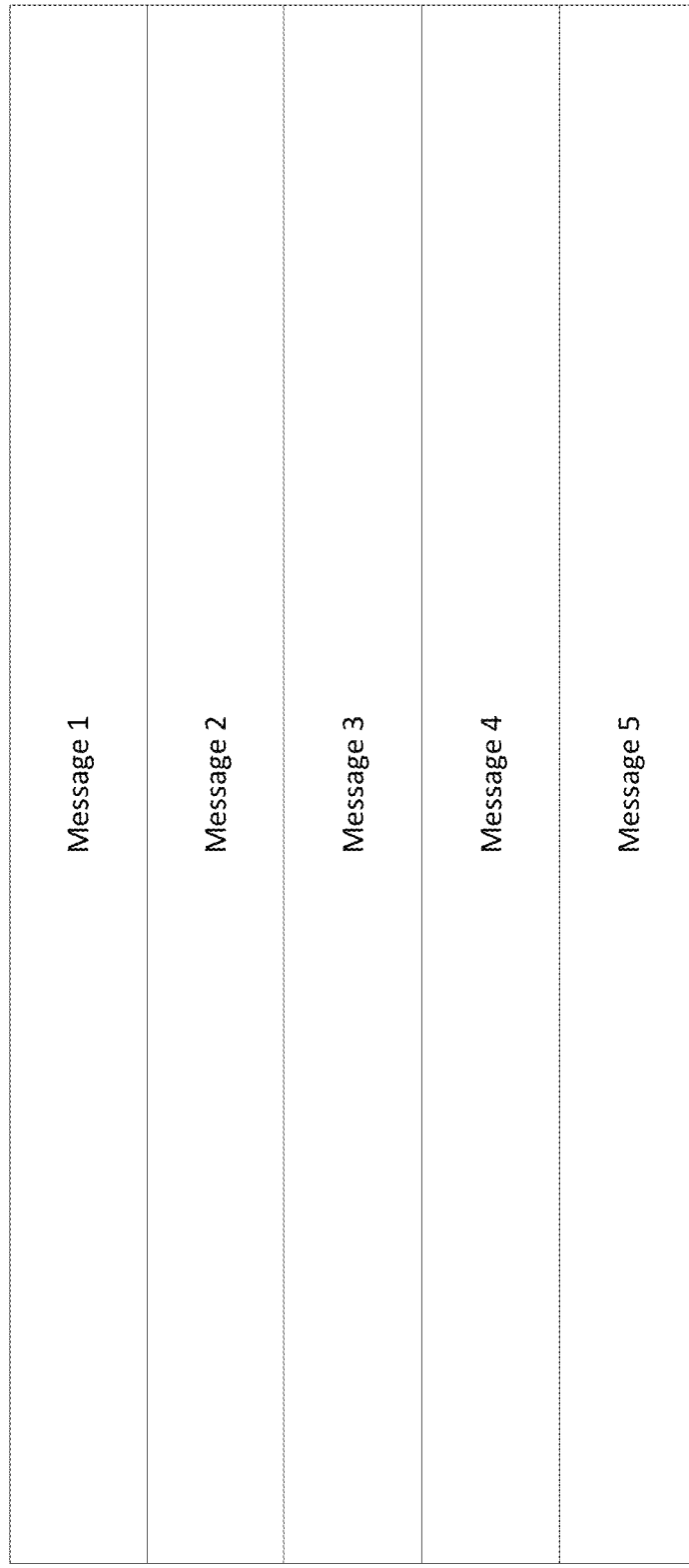
FIG. 6 is an example embodiment of a user inbox in accordance with some embodiments of the present disclosure.

By way of a non-limiting example, FIGS. 6 and 7 display a messaging listing interface portion (items 700 and 800, respectively) of an inbox. The message listing interface 700 displays a set of messages in a user's inbox: messages 1-5. According to the functionality discussed above in relation to FIGS. 4A-4C, message 3 can be identified as a top k message (e.g., a message the user is interested in, which for illustration purposes, is depicted by the "*" in interface 800). Therefore, upon providing the ad message, the interface 700 is modified to the state displayed in interface 800 such that ad message is displayed next to (and above in this non-limiting example) message 3. Thus, even though ad message may have been delivered to the inbox after messages 1 and 2, because of its relationship to message 3 and the ad message sender's bidding processing (as discussed in more detail below in relation to FIG. 5), the inbox is modified from its initial view (from interface 700) to position ad message next to message 3*, as in interface 800.

As discussed above, it should be understood that the ad message depicted in FIG. 7 is not limited to being an email within a message listing of an inbox. That is, the discussion of an ad message with regard to FIG. 7 is for discussion purposes only, as the ad message can be any type of digital content provided by a third party/EM, which as discussed above, can be any known or to be known form of messages, cards or assets without departing from the scope of the instant disclosure. The message content comprised within such messages, cards or assets can be any type of digital content, such as, but not limited to, text, audio, video, graphics interchange format (GIF) files, digital advertisements, uniform resource locators (URLs), and/or any other type of known or to be known multimedia or network resource, or some combination thereof.

Turning to FIG. 5, Process 500 is depicted which details the mechanisms a third party provider can implement to bid on providing an ad campaign to mail users. While the discussion in relation to FIG. 5 and other embodiments herein focus on providing email marketing, it should be construed as limiting, as any forms or types of messages can be inserted into a user's inbox based on their relevance to other message's in the user's inbox.

According to some embodiments of Process 500 of FIG. 5, Steps 502 and 506-516 are performed by the third party content module 312 of the messaging engine 300; and Step 504 is performed by both the viewport module 310 and the third party content module 312.

Process 500 discusses embodiments for engine 300 to provide functionality for mail systems to partner with third party entities enabling the entities to provide digital content for display within an inbox of a user based on the message information determined, discovered, derived or otherwise identified from Processes 400, 450 and 480, as discussed above. For example, email marketers (EM) can bid on positional values to place their messages in a user's inbox. While EMs have a choice to place ads, mail messages, cards or other user interface elements next to the email of interest, the focus of this discussion will be ad messages, which one of skill in the art would understand is non-limiting.

Engine 300 enables a supply and demand based bidding model for advertisers to position their assets into or within a user's inbox. According to some embodiments, the bidding model can be used by both Advertisers (on ONO, for example) and Email Marketers alike. For Non ONO applications using IMAP and POP3, the delivery model is predominantly email messages.

As discussed above, reference to an "advertisement" (or "ad") should be understood to include, but not be limited to, digital media content (e.g., messages, cards or other digital assets) that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

Process 500 begins with Step 502, where a third party content provider (e.g., advertiser or EM) requests to provide a user content within their inbox as part of an ad campaign.

In some embodiments, such request can identify a type of content and request the identity of users that are interested in such content type.

In some embodiments, such request can involve a request to identify which users are in need of receiving content (e.g., determine which users are determined to be interested in such content (e.g., demand); and/or determine which types of content are available for sending to users (e.g., supply)), as discussed below. For example, an EM can request information relating to the current supply and demand of a user or a plurality of users, and in response, the EM can be provided with such information, which can be provided in the form of or displayed within a provided UI, as discussed below in relation to Step 508. In some embodiments, such a real-time request can be processed according to any type of known or to be known bidding protocol, such as, but not limited to, OpenRTB.

In response to this request, engine 300 identifies (or retrieves) the user's viewport score (which was determined from Steps 484-486, as discussed above).

In Step 506, smart tags, which can be supplied by engine 300 as indicators of the types of determined categories (see Step 412), are determined. The smart tags can be selected by the requesting third party. The smart tags provide data indicating the types of content that are associated with the viewport score, as discussed above.

In Step 508, a supply and demand for a category of content is determined based on the viewport score. The supply/demand can be compiled for all or a set of users on a mail domain or across mail domains, and can be based on each user's viewport score. The supply/demand provides an indication as to the number of users that are to receive ads, and the types of content they are to receive (e.g., which types of content does their viewport score indicate they are interested in). In some embodiments, the supply/demand can be based on cohort information: e.g., category, age, location, gender, and the like, which can indicate which types of users are in need of particular content, and whether the supply of EMs can satisfy that demand or how the supply of EM content can satisfy that demand.

In some embodiments, how a user interacts with provided EM content can impact the supply and demand. For example, if the click through rate of a provided ad message satisfies a threshold, then the demand for that type of ad message can increase. In another non-limiting example, if the click through rate for an EM provided ad message satisfies a threshold, then demand for ads from that EM can increase. Thus, for example, the CTR of provided ads/content can have a direct impact on the determined supply and demand from Step 508. Therefore, in some embodiments, the supply and demand can be periodically updated to provide a dynamic indication of the supply and demand, which EMs can use when providing or bidding for opportunities to provide their content to users.

In some embodiments, Process 500 can involve providing the third party content provider with a user interface (UI) associated with an ad portal where the third party content provider is provided a displayed indication of the real-time supply and demand of users. Such UI can be provided to the third party content provider in response to Step 502, as discussed above, or in response to Step 514 (as discussed below).

For example, upon a third party content provider requesting to send content to a user, as in Step 502, the provider can be granted access to or provided access to a portal UI that provides information related to how users can be effectively targeted. Such information can include, but is not limited to, the current and dynamically changing supply and demand of users, the history of their ad targeting, how other EMs are targeting users, the viewport scores of users, click through or realizations of previously provided targeting, and the like, or some combination thereof. This information can be leveraged by the third party content provider to accurately and efficiently determine which content to send to a user(s), as well as the format, timing and mechanisms for targeting that user(s).

Continuing with Process 500, in Step 510, a determination is made as to whether it is appropriate to target a user with an ad message. The determination is based on whether the user is currently online. Engine 300 does not target the user if he/she is online as this can result in sync issues between the user's mailbox and the network datastore housing the user's messages.

Therefore, if the user is online, the process proceeds to Step 512 where engine 300 waits for a received signal that indicates the user has logged off. In some embodiments, Process 500, here, can return to Step 504 as the user's viewport score may have changed or been updated. Thus, Steps 504 and 506 can be repeated provide a current (or more up-to-date or real-time) indication of the smart tags and supply/demand.

If Step 510's determination indicates the user is offline, Process 500 proceeds to Step 514, where the third party content provider is enabled to select and provide an ad message to the user. As discussed above, Step 514 can result in a UI being provided to the third party content provider, where information enabling the provider to target specific users and/or select appropriate content specific to a user(s) is provided to the third party content provider. In some embodiments, the content in the message is based on the smart tags (that match the viewport score of the receiving user), and the supply of EM content and demand of the user(s).

In Step 516, the selected ad message is communicated for display within the user's inbox, as discussed above in relation to Step 492 and FIGS. 6-7. In some embodiments, the selected ad message can be sent in response to the request for an ad message from Steps 486-488, as discussed above in relation to FIG. 4C.

In some embodiments, the ad message can be modified to conform to attributes or capabilities of the page, interface, message, platform, application or method upon which the ad message will be displayed, and/or to the application and/or device for which it will be displayed. In some embodiments, the ad message is sent directly to a user computing device for display on the device and/or within the UI displayed on the device's display.

By way of a non-limiting example, a third party provider, for example, Verizon®, can better target their potential customers by placing ad messages comprising content related to Verizon Wireless' new plans next to a monthly bill message from a competitor in a user's inbox. In another example, an EM can provide free shipping promotions from vendors like Shoprunner® or Amazon® next to order confirmation emails.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:
analyzing, via a computing device over a network, messages of an inbox of a user, and based on said analysis of the messages, identifying message data of each of the messages;
analyzing, via the computing device, said message data, and based on said analysis of the message data, determining category information for the user, said category information indicating a time when the user interacted with each message and a category of content included in each message, said category information further indicating a set of messages that the user is most interested in;
analyzing, via the computing device, communication signals between the inbox and said computing device, said signals providing information related to a type of activity performed by the user on said messages and a time said activity was performed;
analyzing, via the computing device, said signals, and based on said analysis of the signals, determining a behavior of said user;
determining, via the computing device, a probability score based on said behavior, said probability score providing an indication as to when the next time the user will login to said inbox;
applying, via the computing device, a weight to the category information and the probability score;
determining, via the computing device, a viewport score based on the weighted category information and probability score;
requesting, via the computing device, third party content, said request comprising said viewport score as part of a query;
receiving, at the computing device, a message from a third party that comprises said third party content; and
causing, via the computing device, a modification of a display of the user inbox based on said third party message, said modification comprising positioning said third party message within said inbox at a position relative to at least one of said set of messages.

2. The method of claim 1, wherein said modification of said inbox display is performed when said user is offline.

3. The method of claim 1, wherein said third party message is positioned at a position in a message listing in said inbox proximate to at least one of the set of messages, said proximate position selected from a group consisting of: adjacently above at least one of said set of messages, adjacently below at least one of said set of messages, within n positions above of at least one of said set of messages, and within n positions below at least one of said set of messages.

4. The method of claim 1, further comprising:
monitoring said inbox for a new message associated with said category of content; and
receiving said new message, wherein said caused modification of the inbox display further comprises displaying said third party message relative to said received new message.

5. The method of claim 1, further comprising:
monitoring, over the network, user account data associated with the inbox to identify when the user logs in to an account associated with said inbox;
detecting, based on said monitoring, a login by said user; and
identifying a timestamp associated with said login, wherein said timestamp is factored as part of said behavior determination.

6. The method of claim 5, wherein said analysis of said communication signals is based on said detection of said login.

7. The method of claim 1, wherein said weighting causes the category information to outweigh the probability score.

8. The method of claim 1, further comprising:
receiving a request from said third party to provide content to an inbox of a user, said request comprising an indication from the third party for information as an opportunity for sending content to at least one user;

defining smart tags for content provided by said third party based on said viewport score;
determining a supply and demand for a category of content based at least in part on said viewport score and information provided by a set of third parties;
enabling said third party to select content based on said determination; and
receiving said third party message based on said smart tags and said determined supply and demand.

9. The method of claim 1, wherein said viewport score provides an indication as to the category of content the user is interested in and will be interacting with when back online.

10. A non-transitory computer-readable storage medium tangibly encoded with computer-executable instructions, that when executed by a processor associated with a computing device, performs a method comprising the steps of:
analyzing, via the computing device over a network, messages of an inbox of a user, and based on said analysis of the messages, identifying message data of each of the messages;
analyzing, via the computing device, said message data, and based on said analysis of the message data, determining category information for the user, said category information indicating a time when the user interacted with each message and a category of content included in each message, said category information further indicating a set of messages that the user is most interested in;
analyzing, via the computing device, communication signals between the inbox and said computing device, said signals providing information related to a type of activity performed by the user on said messages and a time said activity was performed;
analyzing, via the computing device, said signals, and based on said analysis of the signals, determining a behavior of said user;
determining, via the computing device, a probability score based on said behavior, said probability score providing an indication as to when the next time the user will login to said inbox;
applying, via the computing device, a weight to the category information and the probability score;
determining, via the computing device, a viewport score based on the weighted category information and probability score;
requesting, via the computing device, third party content, said request comprising said viewport score as part of a query;
receiving, at the computing device, a message from a third party that comprises said third party content; and
causing, via the computing device, a modification of a display of the user inbox based on said third party message, said modification comprising positioning said third party message within said inbox at a position relative to at least one of said set of messages.

11. The non-transitory computer-readable storage medium of claim 10, wherein said modification of said inbox display is performed when said user is offline.

12. The non-transitory computer-readable storage medium of claim 10, wherein said third party message is positioned at a position in a message listing in said inbox proximate to at least one of the set of messages, said proximate position selected from a group consisting of: adjacently above at least one of said set of messages, adjacently below at least one of said set of messages, within n positions above of at least one of said set of messages, and within n positions below at least one of said set of messages.

13. The non-transitory computer-readable storage medium of claim 10, further comprising:
monitoring said inbox for a new message associated with said category of content; and
receiving said new message, wherein said caused modification of the inbox display further comprises displaying said third party message relative to said received new message.

14. The non-transitory computer-readable storage medium of claim 10, further comprising:
monitoring, over the network, user account data associated with the inbox to identify when the user logs in to an account associated with said inbox;
detecting, based on said monitoring, a login by said user; and
identifying a timestamp associated with said login, wherein said timestamp is factored as part of said behavior determination, wherein said analysis of said communication signals is based on said detection of said login.

15. The non-transitory computer-readable storage medium of claim 10, wherein said weighting causes the category information to outweigh the probability score.

16. The non-transitory computer-readable storage medium of claim 10, further comprising:
receiving a request from said third party to provide content to an inbox of a user;
defining smart tags for content provided by said third party based on said viewport score;
determining a supply and demand for a category of content based at least in part on said viewport score and information provided by a set of third parties;
enabling said third party to select content based on said determination; and
receiving said third party message based on said smart tags and said determined supply and demand.

17. The non-transitory computer-readable storage medium of claim 10, wherein said viewport score provides an indication as to the category of content the user is interested in and will be interacting with when back online.

18. A computing device comprising:
a processor; and
a non-transitory computer-readable storage medium for tangibly storing thereon program logic for execution by the processor, the program logic comprising:
logic executed by the processor for analyzing, via the computing device over a network, messages of an inbox of a user, and based on said analysis of the messages, identifying message data of each of the messages;
logic executed by the processor for analyzing, via the computing device, said message data, and based on said analysis of the message data, determining category information for the user, said category information indicating a time when the user interacted with each message and a category of content included in each message, said category information further indicating a set of messages that the user is most interested in;
logic executed by the processor for analyzing, via the computing device, communication signals between the inbox and said computing device, said signals providing information related to a type of activity performed by the user on said messages and a time said activity was performed;

logic executed by the processor for analyzing, via the computing device, said signals, and based on said analysis of the signals, determining a behavior of said user;

logic executed by the processor for determining, via the computing device, a probability score based on said behavior, said probability score providing an indication as to when the next time the user will login to said inbox;

logic executed by the processor for applying, via the computing device, a weight to the category information and the probability score;

logic executed by the processor for determining, via the computing device, a viewport score based on the weighted category information and probability score;

logic executed by the processor for requesting, via the computing device, third party content, said request comprising said viewport score as part of a query;

logic executed by the processor for receiving, at the computing device, a message from a third party that comprises said third party content; and logic executed by the processor for causing, via the computing device, a modification of a display of the user inbox based on said third party message, said modification comprising positioning said third party message within said inbox at a position relative to at least one of said set of messages.

19. The computing device of claim 18, wherein said modification of said inbox display is performed when said user is offline.

20. The computing device of claim 18, further comprising:

logic executed by the processor for receiving a request from said third party to provide content to an inbox of a user;

logic executed by the processor for defining smart tags for content provided by said third party based on said viewport score;

logic executed by the processor for determining a supply and demand for a category of content based at least in part on said viewport score and information provided by a set of third parties;

logic executed by the processor for enabling said third party to select content based on said determination; and logic executed by the processor for receiving said third party message based on said smart tags and said determined supply and demand.

* * * * *